United States Patent [19]

Hunkeler

[11] 4,038,732
[45] Aug. 2, 1977

[54] VERSATILE CUTTING TOOL FOR GEAR MANUFACTURE

[75] Inventor: Ernst J. Hunkeler, Fairport, N.Y.

[73] Assignee: The Gleason Works, Rochester, N.Y.

[21] Appl. No.: 723,424

[22] Filed: Sept. 15, 1976

[51] Int. Cl.² .......................................... B26D 1/12
[52] U.S. Cl. ............................. 29/105 A; 29/103 C
[58] Field of Search ....................... 29/103 C, 105 A

[56] References Cited

U.S. PATENT DOCUMENTS

| 2,033,384 | 3/1936 | Marshall | 29/105 A |
| 2,557,404 | 6/1951 | Armitage et al. | 29/105 A |
| 3,268,980 | 8/1965 | Blakesley et al. | 29/105 A |

FOREIGN PATENT DOCUMENTS

| 194,219 | 3/1957 | Austria | 29/105 A |

*Primary Examiner*—Leonidas Vlachos
*Attorney, Agent, or Firm*—Morton A. Polster

[57] ABSTRACT

Versatile face-mill cutting tool apparatus particularly useful in the manufacture of relatively large gears having diameters of 2 to 6 feet (0.6 to 2 meters). A single cutter body can be used in combination with one set of cutter blades to satisfy a wide variety of tool parameters: Blades and blade holders can be readily reversed as required for clockwise or counter-clockwise tool rotation. The angle of the cutting edge of each blade can be adjusted through a fairly wide range of settings as required by the design of the tooth slot being cut. Fine radial adjustments of cutting blades can be made for cutter truing and gear tooth development without shims. This latter feature is accomplished by moving the blade holders along respective straight line paths which, when extended, form an equilateral convex polygon about the center of rotation of the cutter body.

12 Claims, 8 Drawing Figures

4,038,732

VERSATILE CUTTING TOOL FOR GEAR MANUFACTURE

This invention relates to rotary face-mill cutting tools for manufacturing gears and the like and, more particularly, relates to a cutting-tool arrangement in which a single cutter body, in combination with one set of cutter blades, can be used in a variety of orientations to satisfy different cutter specifications which must be met in manufacturing gears of varying design.

BACKGROUND OF THE INVENTION

This invention is part of a recent development in the manufacture of relatively large gears having diameters of approximately 2 to 6 feet (0.6 to 2 meters). The most common method of manufacturing bevel and hypoid gears utilizes rotating face-mill type cutting tools. However, this face-mill system has not been used in the manufacture of large gears until quite recently. Instead, large gears have been manufactured by using planing tools. While planing is not as fast or efficient as the face-mill method, a major deterrent to the use of the latter method has been the projected costs related to traditional face-mill cutting tools of sufficient size for manufacturing large gears.

When cutting gears by the face-mill method, it has traditionally been considered preferable to use cutters having radii roughly equivalent to the outer cone distances of the gears being cut. For relatively flat bevel gears (with pitch angles 70° or higher), this traditional cutter diameter is about equal to the diameter of the gear. Since the size and cost of a gear cutting machine varies directly with the maximum size of the cutter it is designed to use, this traditional selection of cutter diameter is not economically practical for cutting gears larger than two feet in diameter.

While it has been known that larger gears could be cut with face-mill cutters having diameters as small as 60% of the gear diameter, it is also well known that should such smaller diameter cutters be used, development work (i.e., minor changes in cutting parameters undertaken to optimize the final shape of the teeth being cut) would often require that many very small changes be made in point diameter (i.e., the radial distances of the cutting edges of the blades from the center of the cutter). Such changes would not only be time-consuming, but would require that large numbers of expensive shims be stocked.

As to another cutting tool parameter, different cutter blade angles are required according to (a) the shape of the gear tooth being cut, (b) the pressure angle relationship desired between the work and tool, (c) the length of the tooth bearing ultimately desired, etc. To obtain such variety of blade angles requires that manufacturers stock a variety of blade sets, the various sets having been manufactured with an appropriate spectrum of commonly needed blade angles.

Further, when cutting spiral bevel gears, the direction of rotation of the cutting tool often changes with different jobs depending upon such things as the direction of the spiral angle of the gear teeth being cut, whether or not it is desired to cut by conventional milling or by climb milling, the direction of the cutting roll, etc., as is well known in the art. In prior art cutting tools, a change in the direction of cutter rotation requires that different cutting blades be used and often requires the use of different cutter bodies as well.

Thus, it can be appreciated from the above remarks that to manufacture a variety of gears with face-mill cutters, a manufacture must have cutting tools which can meet a variety of tool parameters, e.g., different cutting blade angles and blade point diameters, in addition to differing directions of cutter rotation. Further, a single blade used in the cutting of large gears can cost considerably more than an entire set of blades used for cutting smaller gears. Therefore, in spite of the relative advantages, in terms of speed and efficiency, of the face-mill cutting method over planing methods, the expected cost of maintaining an appropriate inventory of cutter bodies, blades, shims, etc., has seemed prohibitive and has been an important deterrent to the use of the face-mill system for large gear manufacture.

The invention disclosed herein helps to solve this problem by providing a versatile cutting tool in which a single cutter body can be used in combination with a single set of cutter blades to provide proper tool parameters for covering a wide variety of different cutting situations.

BRIEF DESCRIPTION OF THE INVENTION

The novel cutting apparatus disclosed herein is remarkably versatile. The radial settings of the blades can be readily changed without requiring the use of expensive shims. The same body and blades can be used for either clockwise or counter-clockwise cutter rotation. The same cutter blades can be used to cover a wide variety of blade angle requirements.

The body of the rotating cutter includes blade-holding means which are adjustable along respective linear paths which form the sides of an equilateral convex polygon about the center of rotation of the cutter body. Each blade holder positions its respective cutting blade so that the cutting edge is "off-set" from a radial line perpendicular to the linear adjustment path of the blade holder. In this way, a minor adjustment of the blade holder in one direction along its linear path increases the distance of the cutting edge from the center of rotation of the cutter, while adjustment of the blade holder in the opposite direction reduces this radial distance. Therefore, instead of requiring shims, the blade holders are readily movable along their respective linear paths by screw means to provide necessary changes in cutter point diameter for purposes of cutter truing and gear tooth development.

The blade-receiving slot of each blade holder is canted to permit the shank of the blade to be square to the blade's cutting portion, thereby reducing considerably the cost of manufacturing the individual cutting blades.

Each individual blade holder can be mounted to the cutter body in either of two orientations differing from each other by 180°. The blade holders are used in one orientation for clockwise cutting, and in the opposite orientation for counterclockwise cutting. Similarly, the individual blades themselves are reversible: An "inside" cutting blade used for clockwise cutting can also be used as an "outside" cutting blade for counter-clockwise cutting, and vice versa.

The blade angle of any individual blade can be varied through a relatively wide range by the selection of an appropriate wedge which can be placed under the shank of the blade in either of two directions. Incremental sets of wedges are provided. For instance, a set of four wedges (0°, 1°, 2°, and 3°,) permits adjustment of the basic blade angle of the individual blade in 1° increments from −3° to +3°. Since wedges tend to loosen, i.e., to "squeeze out" when under compression, a pin in the slot of the blade holder cooperates with one of two recesses in each of the wedges, depending upon the direction in which the wedge is oriented, to prevent such undesired movement of the wedge.

For extremely fine truing of the blade angle, a large portion of the bottom of each wedge is slightly recessed to permit very slight distortion of the wedge whenever compression forces of the blade clamping screws are increased above a predetermined amount. This distortion is sufficient to make vary small changes (ten thousandths of an inch or two thousandths of a millimeter) in the effective width of the wedge and, thereby in the angle of the cutting edge of the blade.

DETAILED DESCRIPTION OF INVENTION

Figure 1:
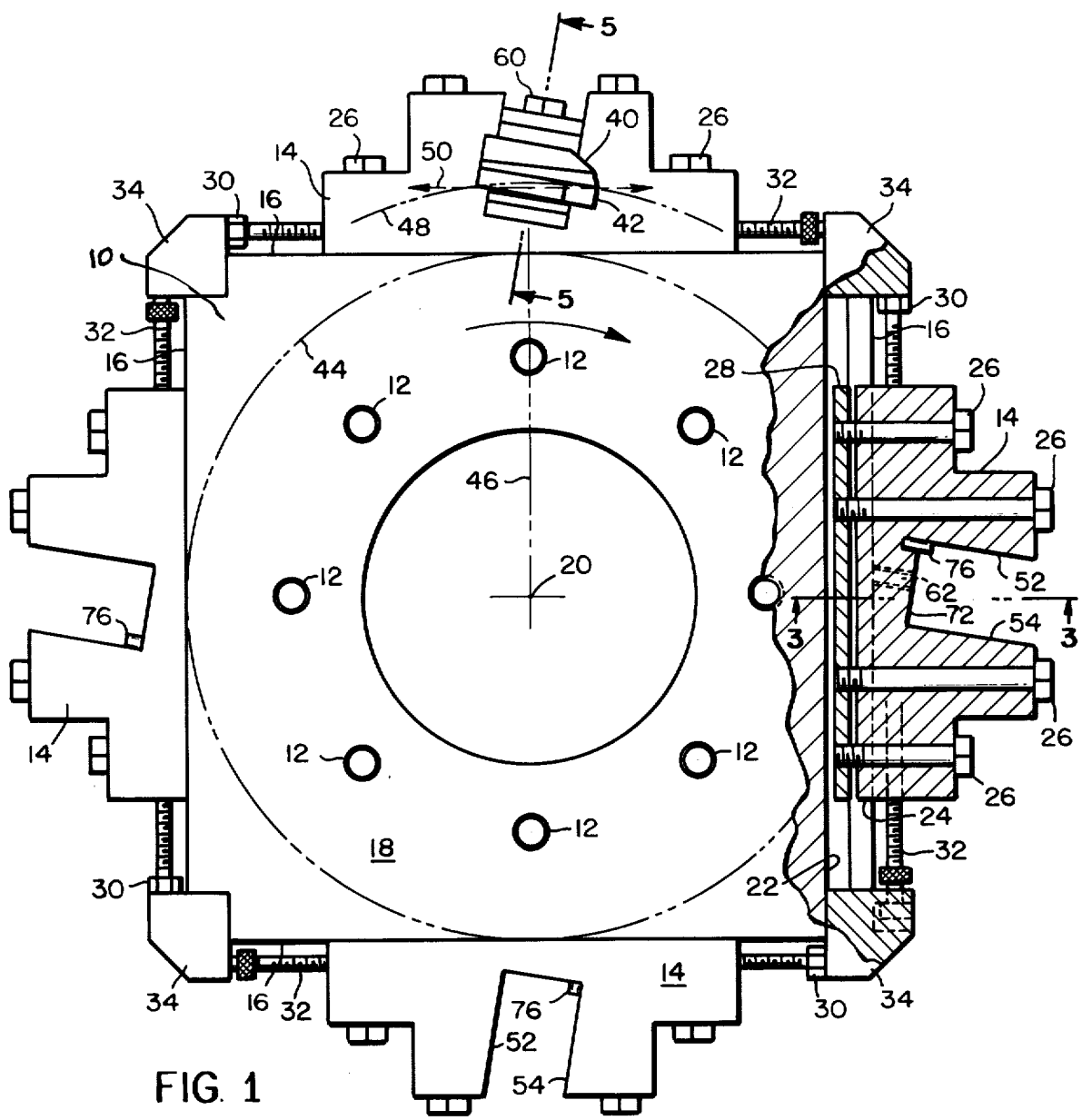
FIG. 1 is a plan view of a cutting tool according to the invention with only one cutting blade shown in position and including a partial cross section of one blade-mounting means.
Figure 2:
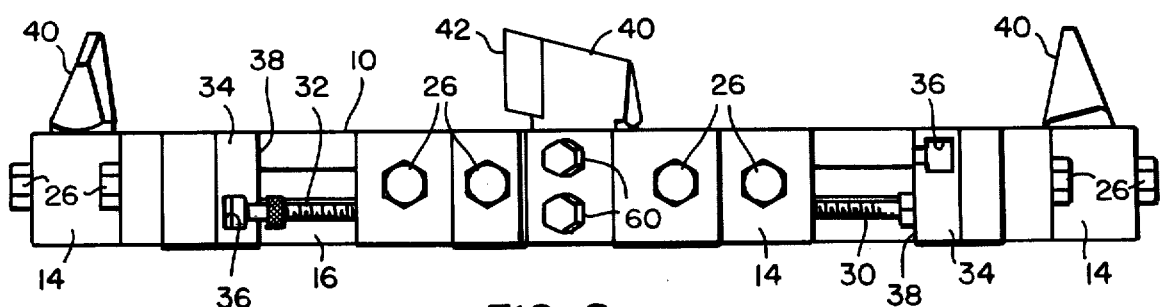
FIG. 2 is an elevation of the cutting tool shown in FIG. 1 with the addition of cutting blades omitted from FIG. 1.

Referring first to FIGS. 1 and 2, a tool body 10 is provided with a plurality of bolt holes 12 for mounting the cutting tool on the spindle of a gear manufacturing machine. In this preferred form, a plurality of blade holders 14 are mounted upon respective side faces 16 of body 10, each respective side face being perpendicular to front face 18 of body 10 with the lines of intersection between the side and front faces forming, when extended, an equilateral convex polygon about center of rotation 20. It should be appreciated that while the tool body shown is in the general form of a square (a four-sided equilateral convex polygon), the invention contemplates other polygonal shapes as well, e.g., pentagon, hexagon, and octagon.

Figure 3:
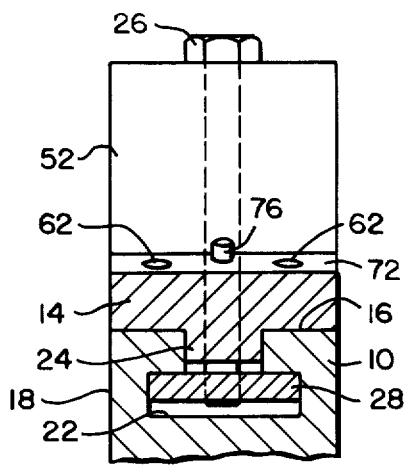
FIG. 3 is a slightly enlarged view taken along line 3—3 of the cross-sectioned mounting means shown in FIG. 1.

Means for mounting the blade holders to the tool body are shown in the sectioned portion of FIG. 1 and in FIG. 3. A T-slot 22 in each side face 16 receives a tongue 24 formed in the bottom of blade holder 14. A plurality of bolts 26 pass through appropriate holes in blade holder 14 and thread into a bolt plate 28, the tightening of bolts 26 causing bolt plate 28 to be pulled against the upper edges of T-slot 22 to secure blade holder 14 against movement.

When bolts 26 are loosened, blade holder 14 can be adjusted along a linear path by appropriate screw means comprising a locking bolt 30 and an adjusting screw 32. A plurality of corner blocks 34 are fixed to each corner of tool body 10 and include a respective screw slot 36 and a bolt abutment 38. The head of adjusting screw 32 is received in screw slot 36, while its other end is threaded into blade holder 14. Therefore, rotation of adjusting screw 32 causes blade holder 14 to move along it linear path defined by T-slot 22. The linear path of movement of each of the respective blade holders is effectively parallel to a side of the convex polygon referred to above. Following positioning of a blade holder by rotation of adjustment screw 32, locking bolt 30, which is threaded into the opposite side of blade holder 14, is unscrewed until it presses against bolt abutment 38, thereby preventing further linear movement of the blade holder. Bolts 26 are then tightened to secure the blade holder in its adjusted position.

Before describing the blade-supporting means in detail, attention is called to the relative position of the cutter blade 40 shown in FIG. 1 and, generally, to the adjustability of its cutting edge 42. This adjustment is used to make fine radial changes in cutting edge 42, and some geometric constructions are superimposed on the apparatus shown in FIG. 1 to facilitate understanding of this feature of the invention. An imaginary circle 44 is shown in phantom lines inscribed within the equilateral convex polygon formed by the straight lines of intersection between the side and front faces of tool body 10, and an imaginary radial line 46 (also shown in phantom lines) has been drawn from the center of rotation 20 through the point of tangency between inscribed circle 44 and one side of the polygon. It will be noted that cutter blade 40 is mounted so that its cutting edge 42 is off-set from radial line 46. The effect of this off-set can be seen by constructing an arc 48 with a radius equal to the radial distance between the tip of cutting edge 42 and center of rotation 20. Adjustment of blade holder 14 along its linear path, in the manner described above, causes the tip of cutting edge 42 to move along dotted line 50. It can be seen that adjustment to the right causes cutting edge 42 to move beyond arc 48, i.e., increases the radial distance of edge 42 from center of rotation 20, while adjustment to the left along dotted line 50 causes edge 42 to move inside arc 48, thereby reducing the radial distance of cutter edge 42. In this manner, blades 40 can be radially adjusted for blade truing the tooth-shape developments without changing shims.

Figure 4:
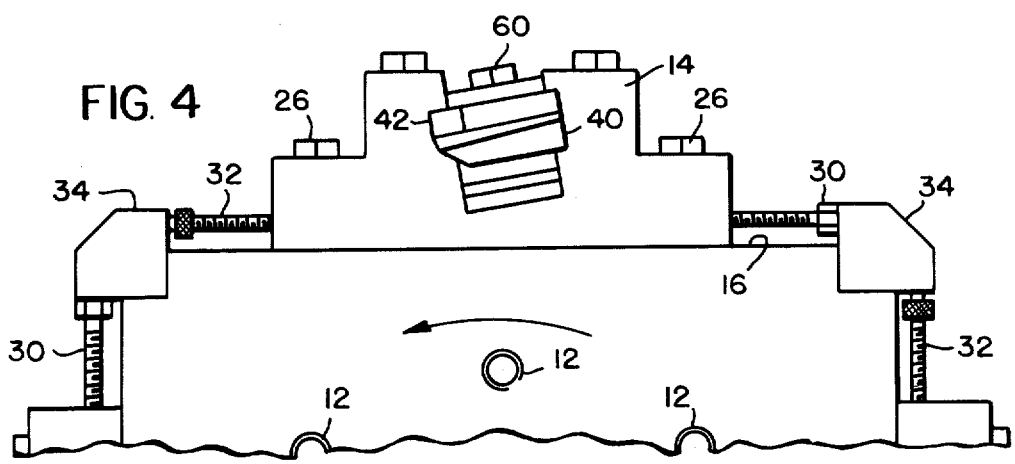
FIG. 4 shows the same blade holder and cutting blade illustrated in the upper portion of FIG. 1, but each is shown positioned in an opposite orientation 180° reversed from its respective position in FIG. 1.

The same blade holder 14 and cutting blade 40, shown in FIG. 1 mounted on tool body 10 for clockwise rotation of the cutting tool, can each be respectively re-oriented 180° and remounted, as shown in FIG. 4, for a different cutting operation in which counter-clockwise tool rotation is required. It will be appreciated that this is accomplished by backing bolts 26 out of bolt plate 28, loosening locking bolt 30 so that the head of adjusting screw 32 can be lifted from screw slot 36 of the left hand corner block 34 (see FIG. 2) and reinserted in the screw slot of the opposite corner block. Bolts 26 are then reinserted into bolt plate 28 and, following the reversal and appropriate mounting of blade 40 in the manner to be explained below, blade holder 14 can be readjusted to assure proper radial positioning of cutting edge 42, etc., in accordance with the design requirements of the particular gear tooth being cut.

It should be noted that in order for the cutting portion of any gear-cutting blade to avoid interference with the workpiece as the blade passes through a tooth slot being cut, it is necessary for this cutting portion to be mounted so that its sides are substantially parallel to the cutting path through which the blade moves as it cuts a tooth slot in a workpiece. Further, as will be appreciated by those skilled in the art, blade manufacture is simplified and, therefore, made more economical, if blades are designed with the sides of the blade shanks generally parallel to the sides of the cutting portion of the blade. Such economically manufactured blades can be used with the apparatus disclosed herein by virtue of the special design of blade holders 14.

Referring now to FIGS. 1, 3, 5, 6A, and 6B, the preferred embodiment of each blade holder 14 includes a canted blade-receiving slot partially defined by plane surfaces 52, 54 which are inclined acutely to a respective side of the equilateral polygon, that is, canted surfaces 52 and 54 are inclined acutely to the linear path along which blade holder 14 is adjustable. The amount of inclination is selected so that both the shank and cutting portion of blade 40 will be substantially parallel to the cutting path through which the blade moves, as just referred to above.

The shank of each cutter blade 40 includes a pair of plane surfaces 56, 58 which are adapted to mate with surfaces 52, 54 of blade holder 14. A pair of clamping bolts 60, which can be tightened into a pair of threaded holes 62 in the bottom of the blade-receiving slot, pass through appropriate holes in sets of shims 64, top wedges 66, and bottom wedges 68 as well as through clearance holes 70 in the shank portion of blade 40.

Figure 5:
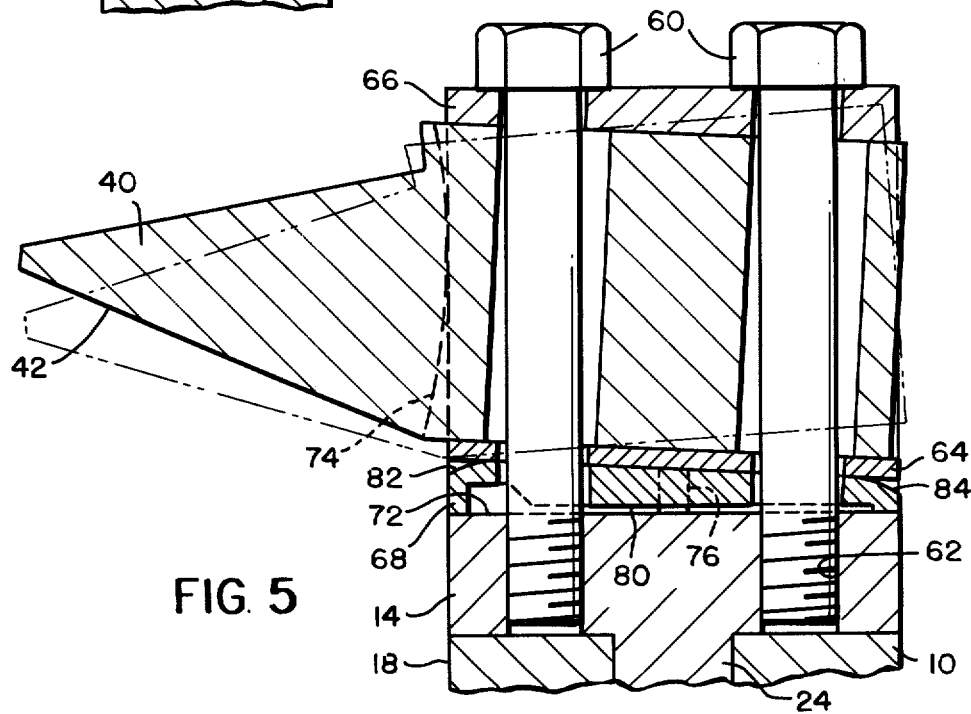
FIG. 5 is an enlarged cross-sectional view of the blade holder and blade viewed in the direction of the arrows along line 5—5 of FIG. 1.

The means for securing blades 40 in blade holders 14 is best seen in FIG. 5. A shim 64 is used to provide rough radial positioning of cutting edge 42 of blade 40, finer radial adjustment being made by the tangential positioning of blade holder 14 in the manner described above.

To provide versatility for blade angle adjustment, i.e., the angle between cutting edge 42 and the plane of front face 18 of tool body 10, a selected wedge can be replaced between bottom surface 72 of the blade-receiving slot and the shank portion of cutter blade 40. Any one of a set of wedges 68 (provided, for instance, in 1° increments, such as 0°, 1°, 2°or 3°) can be used in either of two orientation to provide a range of angular adjustment for cutting edge 42. In FIG. 5, wedge 68 represents the largest of the wedges so that blade angle of cutting edge 42, as shown in solid lines, is considerably greater (e.g., +3°) than it would be were a 0° wedge being used. Since the wedges are reversible, wedge 68 can be reversed 180° from its illustrated position, and such reversal results in changing the blade angle to considerably less (e.g., −3°) than would be the case were a 0° wedge used. Thus, the reversal of wedge 68 results in a substantial change in blade angle, moving blade 42 to the position shown in phantom lines in FIG. 5.

To insure proper and rigid support for blade 40, top wedge 66 is selected with the same number or degrees as bottom wedge 68, but top wedge 66 is placed on the opposite side of the shank of blade 40 and in an orientation 180° different from that of bottom wedge 68, thereby providing the heads of bolts 60 with a seating surface parallel to bottom surface 72 of the receiving slot. As a further means for maintaining rigid support of blade 40, each blade is provided with a circular arc seat 74 which extends from the back of the blade to rest solidly against a surface of blade holder 14 in all positions of blade angle adjustment. It can be seen that each blade holder 14 has two side surfaces parallel to front face 18 of body 10, and circular arc seat 74 rests against one or the other of these side surfaces according to the orientation of the blade holder for clockwise or counter-clockwise cutting.

Figure 7:
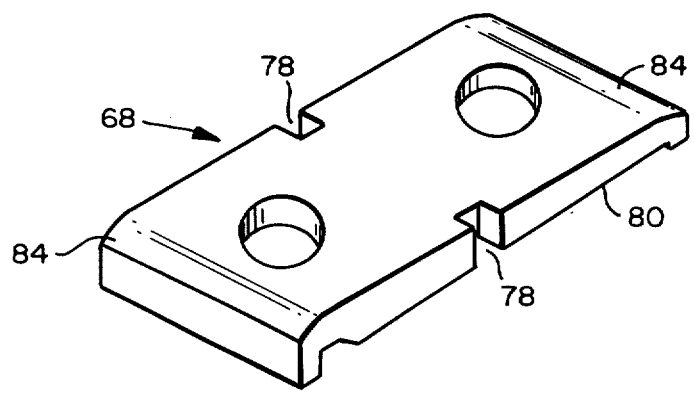
FIG. 7 is a perspective view of a blade angle adjusting wedge.

Also, as part of the blade-supporting means, a pin 76, fixed to bottom surface 72 of the blade-receiving slot, cooperates in close tolerance with either one of a pair of recesses 78 formed in the edges of each bottom wedge 68 (see FIG. 7). With this arrangement, no matter which orientation is selected for wedge 68, it is held by pin 76 to prevent loosening when cutting forces are experienced.

Finally, extremely fine adjustments of blade angle (e.g., for truing purposes) may be achieved by the application of additional clamping forces causing distortion of wedge 68. This is achieved by means of a further, very slight recess of a large portion of the bottom of each wedge 68. This further recess 80 cooperates with a slight rounding of the upper end edges 82 and 84 of the wedge to permit its very slight angular distortion when clamping bolts 60 are tightened with a force exceeding some predetermined torque required for normal securing purposes. (It should be understood that such fine adjustments are measured in ten-thousandths of an inch — thousandths of a millimeter — or less, and that the dimensions in the drawings have been greatly exaggerated for clarity.)

Figures 6A, 6B:
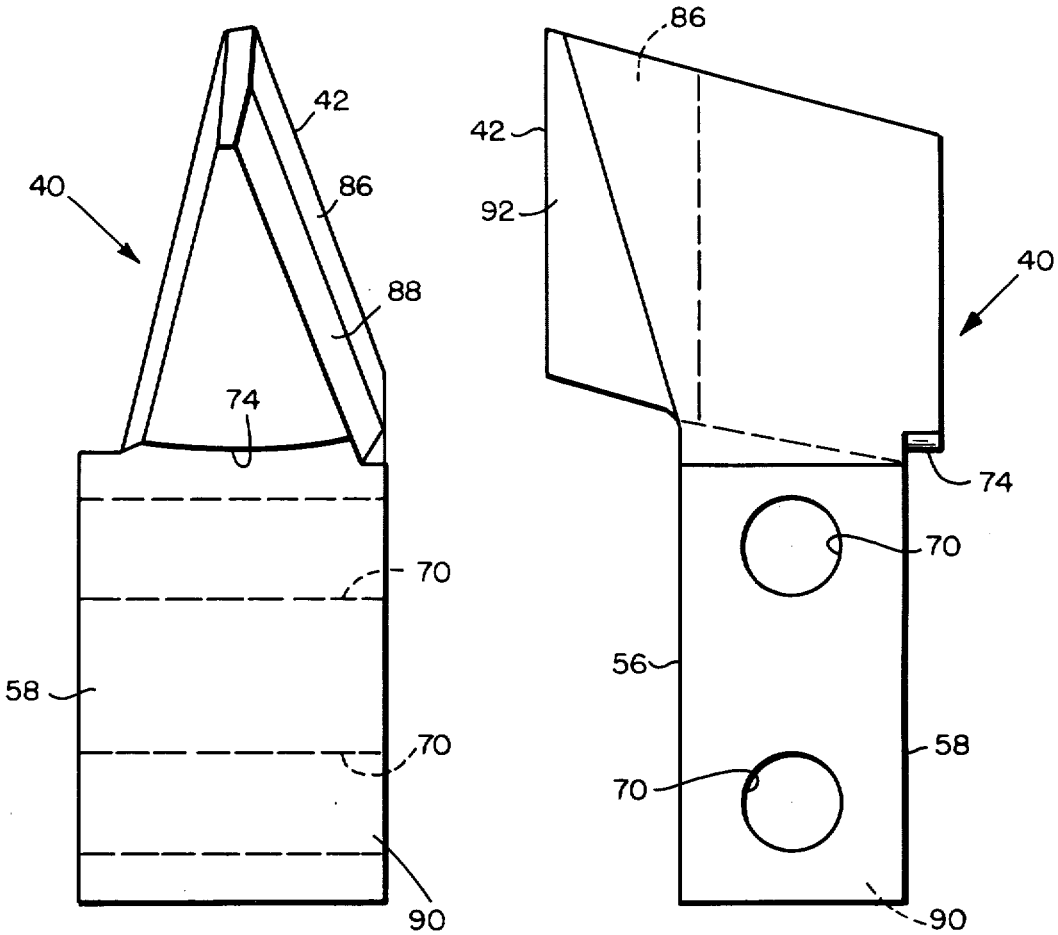
FIGS. 6A and 6B are, respectively, a back view and side view of a cutter blade adapted for use with the cutting tool disclosed herein.

As will be appreciated by those skilled in the art, blades 40 will be made with various top and side reliefs, hook angles, side rakes, etc., depending upon (a) the particular tooth shape being cut, (b) whether or not the cutting is a roughing or finishing operation, and (c) also upon the nature of the cut being made, e.g., inside cut, outside cut of bottoming cut. Nonetheless, certain other features of blades 40 should be pointed out in addition to circular arc seat 74 referred to above. Referring specifically to FIGS. 6A and 6B, it should be noted that the shank of blade 40 is relatively simple, requiring only clearance holes 70 (permitting adjustment of blade angle) and a plane bottom surface 90 perpendicular to parallel side faces 56 and 58, surface 90 cooperating with either bottom wedge 68 or a shim 64 to maintain appropriate blade angle. As noted above, the cutting portion of each blade is substantially parallel to the shank, thereby providing a basic design format that is relatively simple and inexpensive to manufacture.

Further, as will be appreciated by those skilled in the art, blade 40 is designed in a conventional manner so that it can be sharpened by grinding only its sharpening face 92, and the removal of a parallel thickness or sharpening face 92 does not cause any change to the blade angle or to the top and side relief angle. In this regard, attention is called to the plane surfaces of blade 40 which form relieved portions 86 and 88. Relieved portion 86 is located in the resharpenable part of the blade. However, because of the forces involved in cutting large gears, it is essential that the upper portion of blade 40 be made fairly long to provide required rigidity to cutting edge 42, and in order to provide clearance between this extended rearward portion of the blade and the slot of the tooth being cut by the rotary motion of the tool, it is necessary to provide side relief 88 in addition to the normal side relief 86 of the resharpenable portion of the blade.

As was pointed out above, the same blade may be used for clockwise or counter-clockwise cutting. However, it will be appreciated that when clock-wise blade holder 14 and blade 40, as shown in FIG. 1, are each reversed for counter-clockwise cutting, as shown in FIG. 4, cutting edge 42 also reverses, moving from a position closer to bottom surface 72 of the blade receiving slot to a position closer to the open end of the slot. This, in effect, changes blade 40 from an "inside-cutting" blade when cutting clockwise to an "outside-cutting" blade when the cutting tool is rotated counter-clockwise. The opposite is true, of course, with a clockwise-rotating outside blade.

Attention is again called to the fact that while the preferred embodiment disclosed utilizes only four blades mounted in four holders adjustable in linear paths which form a square, similar arrangements can be made with different numbers of blades utilizing tool holders adjustable along linear paths which form the outside of other equilateral convex polygons, e.g., triangles, pentagons, hexagons, etc., depending upon the number of blades desired. Further, the blade holders need not be mounted on the side surfaces of the tool body but, for instance, could be adjustable in appropriate mounting ways fashioned directly on the front face of the tool body.

What is claimed is:

1. In a rotatable face mill tool for cutting gear teeth and the like, including a body portion having a center of rotation and a plurality of blade-holders adjustably mounted on said body each adapted to receive and hold the shank of a respective cutting blade in a predetermined orientation relative to said body so that the cutting edges of the blades project axially from a front face of the body, the improvement comprising:

a plurality of mounting means
each positioned relative to one of a respective plurality of straight lines which, when extended, form an equilateral convex polygon about the center of rotation of the body,
said mounting means each being adapted to support a respective one of said blade-holders in at least one orientation in which the blade holder can be adjusted along a linear path parallel to a respective one of said straight lines; and
each said blade holder including adjustment means and being adapted to hold its respective blade with a cutting edge offset from the radial line of the body passing through the point of tangency between its respective straight line and an imaginary circle inscribed within said equilateral convex polygon so that
adjustment of the blade holder in one direction along its respective linear path increases the radial distance between the balde's cutting edge and the center of rotation of said body and
adjustment of the blade holder in the opposite direction decreases said radial distance.

2. The tool of claim 1 wherein each said mounting means is adapted to support a respective one of said blade holders in either of two opposite orientations in both of which the blade holder can be adjusted along its respective linear path.

3. The tool of claim 1 wherein each said blade holder further comprises a portion forming a blade slot having at least one plane surface adapted to mate with a similar plane surface on the shank portion of its respective cutting blade, said plane surface being inclined acutely to the respective linear path along which the blade holder is adjustable.

4. The tool of claim 1 wherein each said blade holder adjustment means further comprises screw means for cooperating with said mounting means to adjust the position of the blade holder along its respective linear path.

5. The tool of claim 3 wherein each said blade holder includes support means comprising
a plurality of surfaces forming said blade slot for receiving the shank portion of a respective cutting blade,
pre-selected wedge means positionable between a surface of the slot and the shank of a cutting blade for adjusting the angle between the cutting edge of a supported blade and the front face of the tool body, and
releasable clamping means for applying a force to secure a blade rigidly in said slot.

6. The tool of claim 5 wherein said blade slot includes one surface perpendicular to the front face of the tool body, and said wedge means includes a wedge-shaped element adapted to fit in either one or two orientations between said perpendicular surface and the shank portion of a cutting blade.

7. The tool of claim 6 wherein a pin is fixed to said penpendicular surface of the blade slot and said wedge-shaped element includes a pair of recesses for cooperating with said pin to prevent lateral movement of the element when a blade is clamped in the slot, one recess of said pair co-acting with said pin when the element is in one direction and the other recess so co-acting when the element is reversed.

8. The tool of claim 7 wherein said wedge-shaped element includes further recess means for reducing rigidity of the element to compressive forces, whereby, when the securing force applied by said clamping means exceeds a predetermined value, the position of the cutting edge of a blade can be altered for truing purposes when said element distorts under compression.

9. The tool of claim 6 wherein each said blade holder includes a surface parallel to the plane of the front face of the body portion, and further comprising a plurality of cutting blades each having
a shank portion with
a first plane surface for mating with said acutely inclined surface of said blade slot, and
a second plane surface perpendicular to said first surface for mating with said wedge means, and
a circular arc seating portion cooperating with said parallel surface of the blade holder so that the blade seats firmly against the latter surface when said wedge element is positioned in either of its orientations.

10. The tool of claim 9 wherein said blade holder is adapted to be supported by said mounting means in either of two opposite orientations and includes a further surface parallel to the plane of the front face of the body portion, the circular arc seating portion of each cutting blade cooperating with one or the other of said parallel surfaces according to the orientation of its respective blade holder.

11. The tool of claim 1 wherein said body portion has a plurality of side faces in respective planes perpendicular to said front face, said respective plurality of straight lines being formed by the intersection lines of said side faces with the front face, and each said mounting means is arranged along a respective one of said side faces.

12. The tool of claim 11 wherein each said mounting means comprises a T-slot and a bolt plate movable within the slot, and each respective blade holder includes a tongue portion for mating with said T-slot and securing means adapted to cooperate with said bolt plate to rigidly secure the blade holder after it has been adjusted to a desired position along the linear path defined by its respective T-slot.

* * * * *